United States Patent [19]

Golobic et al.

[11] Patent Number: 4,482,253
[45] Date of Patent: Nov. 13, 1984

[54] ROTARY MATERIAL PROCESSOR

[75] Inventors: Robert A. Golobic; Lawrence J. Prosper, both of Colorado Springs, Colo.

[73] Assignee: Joy Manufacturing Company, Pittsburgh, Pa.

[21] Appl. No.: 479,290

[22] Filed: Mar. 28, 1983

[51] Int. Cl.³ .............................................. B01F 15/06
[52] U.S. Cl. ..................................... 366/147; 165/87; 366/320
[58] Field of Search .............. 366/144, 136, 147, 137, 366/292–296, 310, 138, 320, 339; 165/86–88, 92, 93, 109 R

[56] References Cited

U.S. PATENT DOCUMENTS

| | | |
|---|---|---|
| 742,603 | 10/1903 | Czapikowski . |
| 923,047 | 5/1909 | Hanna . |
| 1,036,704 | 8/1912 | Plummer . |
| 1,086,629 | 2/1914 | Valerius . |
| 2,153,082 | 4/1939 | Grill et al. . |
| 2,639,898 | 5/1953 | Reich . |
| 2,654,364 | 10/1953 | Hertrich . |
| 2,731,241 | 1/1956 | Christian . |
| 2,753,159 | 7/1956 | Christian . |
| 2,760,043 | 8/1956 | Christian . |
| 2,917,284 | 12/1959 | Christian . |
| 2,989,289 | 6/1961 | Christian . |
| 3,156,455 | 11/1964 | Boulet . |
| 3,386,708 | 6/1968 | Christian . |
| 3,426,838 | 2/1969 | Onarheim . |
| 3,457,989 | 7/1969 | Nonnenmacher . |
| 3,473,603 | 10/1969 | Fujie . |
| 3,506,066 | 4/1970 | Nonnenmacher . |
| 3,529,661 | 9/1970 | Yousch . |
| 3,549,000 | 12/1970 | Christian . |
| 3,580,389 | 5/1971 | Nonnenmacher . |
| 3,623,548 | 11/1971 | Cook . |
| 3,688,837 | 9/1972 | Ocker . |
| 3,788,392 | 1/1974 | Abbott et al. . |
| 3,837,271 | 9/1974 | Shore et al. . |

Primary Examiner—Timothy F. Simone
Attorney, Agent, or Firm—Edward L. Levine

[57] ABSTRACT

Rotary processors for fluid material conveyance and heat transfer including a plurality of commonly configured coils mounted between rotatable manifolds affixed to a central shaft.

26 Claims, 28 Drawing Figures

ROTARY MATERIAL PROCESSOR

BACKGROUND OF THE INVENTION

This invention relates to rotary material processors and is generally related to processors of the screw conveyor type having conveying, mixing and heat exchange capabilities.

Material processors which function to convey, mix and act as a heat exchanger for fluid materials are well known. The term "fluid material" as used herein refers to any non-gaseous material which can be made to move within or through a screw type processor, and thus includes such diverse materials as liquids, slurries and particulates.

Such processors operate well for their intended purposes, but oftentimes are massive, complex in design and fabrication requirements, and difficult to repair. The requirement to alleviate thermal stresses and strains which occur during operation is a primary cause of design complexity. The processors, when circulating a heat exchange fluid through, for example, discs, tubes or hollow flights, should be highly reliable and free of leakage paths to avoid intermixing of the heat transfer medium and the medium being moved through or within the processor. Stresses are oftentimes induced during manufacture which complicate the maintenance of a high integrity system. Processors of this type often require large amounts of welding during fabrication which can complicate repair and particularly replacement of component parts.

Typically the processors are of two main types. The first utilizes hollow helical flights permanently mounted on a rotatable central shaft which functions to support the flights and direct a heat transfer medium into and out of the flights. These units can provide excellent conveying characteristics. The second type utilizes a singular hollow helical tube wrapped contiguously or spaced about a central rotatable shaft. Flow of a heat transfer medium through the helical tube and commonly the shaft can provide excellent heat transfer characteristics. Other types of mixers and conveyors are known, but are not as common. It is also well known to position two or more processors with hollow helical flights of various profiles in parallel such that the flights intermesh to provide a cleaning or wiping action for the adjacent shaft and conveyor flight assembly.

Exemplary of the first type is U.S. Pat. No. 3,529,661 which discloses hollow helical flights welded across the gaps of a pad wrapped in a helical fashion about a central shaft. This unit is extremely reliable and has found acceptance thoughout a variety of commercial applications. It does, however, require time consuming welding operations. U.S. Pat. No. 2,731,241 is also exemplary, and shows the wide variety of profiles useful as hollow flights, each affixed to a central shaft, particularly where the screw assemblies are arranged in parallel to provide a shearing action against one another.

Exemplary of the second common type is U.S. Pat. No. 2,639,898 which discloses a preheater having a rotatable central shaft and a tubular helical coil attached to the shaft. Fluid flows through a portion of the shaft and through the entirety of the singular coil. The shaft can also be partitioned to provide fluid flow throughout the shaft. This patent also discloses in FIG. 8 a dissolver unit having two spaced, rotatable hollow header discs between which extend plural helical tubes of such large pitch that less than a complete turn is encompassed by the tubes. A heating medium flows from one header, through the tubes to the other header, and then to a discharge.

Among some of the other types of processors is that disclosed in U.S. Pat. No. 2,753,159 which includes subassemblies of a single hollow flight permanently mounted on a shaft, with a number of the subassemblies secured between two rotatable drums which drums are also joined by a central shaft. A heat transfer fluid flows through a portion of the shaft to one drum, in parallel through the plural subassemblies to the other drum, and back through a section of the central shaft. Rotation of the central shaft rotates the entire assembly.

Another type of processor is disclosed in U.S. Pat. No. 3,386,708 which includes a plurality of concentric cylinders and concentric hollow or solid helical screws of differing diameters interspersed among the cylinders. The unit can be operated as a conveyor or is stated to be capable of a design which provides no conveying action, but merely a turning of the feed material within a cylinder.

Yet another processor type is disclosed in U.S. Pat. No. 2,153,082 and includes sets of water circulating tubes appearing generally as a part of a helical turn, each extent of each tube receiving or transferring fluid to and from headers within a central shaft from which the tubes extend. Also included is a helical scraper of plural turns extending radially about the length of the central shaft.

Another type of processor, disclosed in U.S. Pat. No. 742,603, includes hollow spaced manifolds each having three identically sized radially extending arms and a plurality of straight tubes extending between the arms of the two manifolds. A heat transfer fluid flows back and forth through the arms and tubes in a prearranged pattern such that the overall fluid flow path is generally described as being of spiral fashion.

Each of the disclosed processors, while useful for its intended purpose, has certain difficiencies for which improvement can be made. This is exemplified by the difficulties associated with the fabrication and repair of each unit. Additionally, high stresses induced during manufacture, particularly in the vicinity of the weldments, often exist among processor components which stresses are intensified under operating conditions and which can eventually lead to failure. It is thus desirable to provide a material processor which alleviates these and other concerns and particularly which is reliable yet easy to repair and maintain in the event of failure.

SUMMARY OF THE INVENTION

This invention provides rotary material processors which are useful in conveying, mixing and providing a heat transfer function for fluid materials. In preferred form, two spaced parallel manifolds are fixedly mounted to a central shaft and positioned within a housing. The manifolds can be of any convenient shape, such as a disc, but are preferably shaped as a plurality of fingers of preselected length, at least some of which differ in length from other fingers in a preselected fashion, and which fingers extend outwardly from a central region. Extending between the fabricated manifolds are a plurality of coiled helical members, such as hollow conduits or solid tubes. Each coiled helical member, or coil, appears generally as a helical spring and preferably is formed into its coil shape from initially straight sections through a conventional coiling process. The coiled members are readily interchangable among one another. The coils are of common length, pitch and tube diameter, and may terminate at each end in mounting blocks which are removably fastened to the manifolds, or in mounting elbows. The coiled members can also be welded at their extremities to the manifolds. It will be recognized that during operation, stresses imposed at the junctures of the coiled members and manifolds are generally equalized among each coil and the next since the coils are commonly shaped and sized, and are exposed to substantially identical operating conditions.

In one preferred embodiment each coiled member is positioned entirely aside the central shaft. in this manner the central shaft does not interfere with replacement of any single coiled member. In another preferred form a plurality of commonly configured coiled members do encircle the central shaft. Such coils are spaced about the shaft, and are simply supported from the manifolds. Clamping bars can be used in either case to additionally support intermediate portions of the coiled members at selected positions along the length of the shaft. Such supports are preferably removable.

The coiled members and the central shaft can be solid, providing primarily a conveying or mixing function. Coiled members of numerically similar, but oppositely directed pitch can be utilized to provide, for example, a mixing and a conveying function. Preferably, the manifolds and coiled members are hollow, and a heat transfer medium is directed through the central shaft to one manifold, in parallel through the plural coiled members to the other manifold, and back to the central shaft and a discharge circuit. The use of coiled members without a central shaft or support for each provides a high surface area and thus highly efficient heat transfer to the fluid medium flowing within the processing unit.

The shaft, manifold and coil assembly is contained within a trough or housing into which the material to be mixed, conveyed or otherwise processed is fed. The housing preferably includes a bottom or side discharge and a top inlet. Paddles can be mounted to the central shaft at the discharged end of the unit to assist the mixing and discharging and to continuously scrape the housing.

BRIEF DESCRIPTION OF THE DRAWINGS

The advantages, nature and additional features of the invention will become more apparent from the following description, taken in connection with the accompanying drawings in which.

DESCRIPTION OF THE PREFERRED EMBODIMENTS

Figure 1:
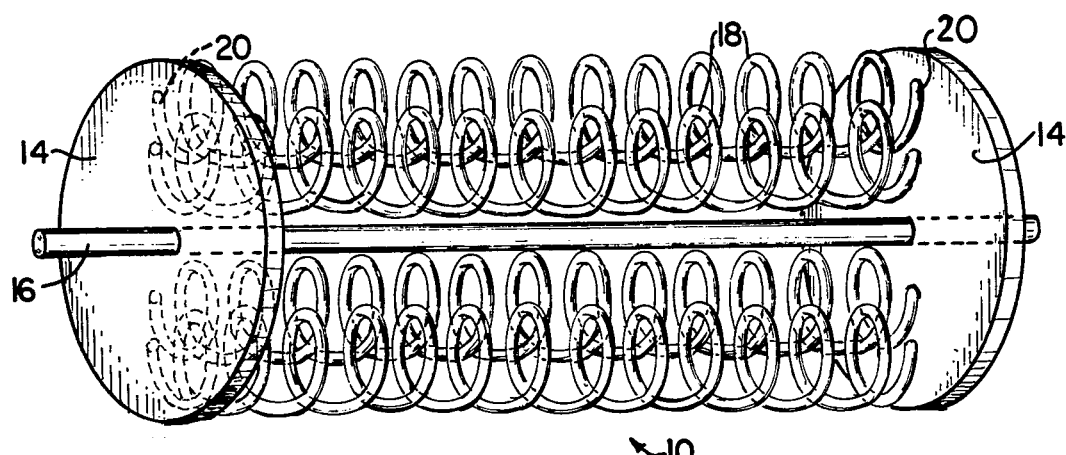
FIG. 1 is a perspective view of the primary assembly of a simple rotary material processor in accordance with the invention.
Figure 2:
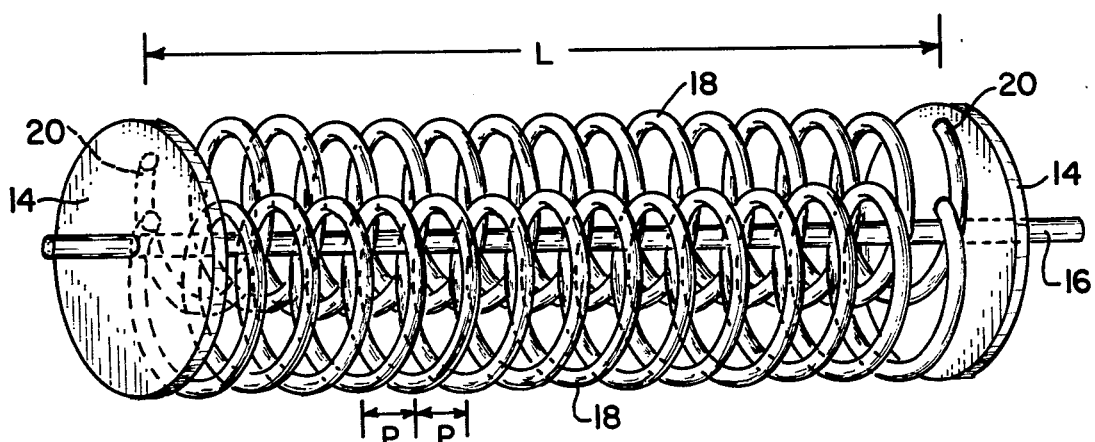
FIG. 2 is a perspective view, similar to FIG. 1, of another embodiment of a processor in accordance with the invention.

Referring now to FIGS. 1 and 2 there are shown alternate exemplary embodiments of assemblies of rotary material processors 10 in accordance with the invention. Each processor 10 includes a pair of parallel, spaced manifolds 14 affixed to rotate upon rotation of a central shaft 16. Fixedly or removably attached between the manifolds 14 are a plurality of coils 18. The coils 18 of the processor 10 of FIG. 1 are positioned aside the central shaft 16, so that the shaft does not intersect the radially peripheral envelope defined by each coil 18. The coils 18 of the processor 10 shown in FIG. 2, however, wrap about the central shaft 16.

Figure 1A:
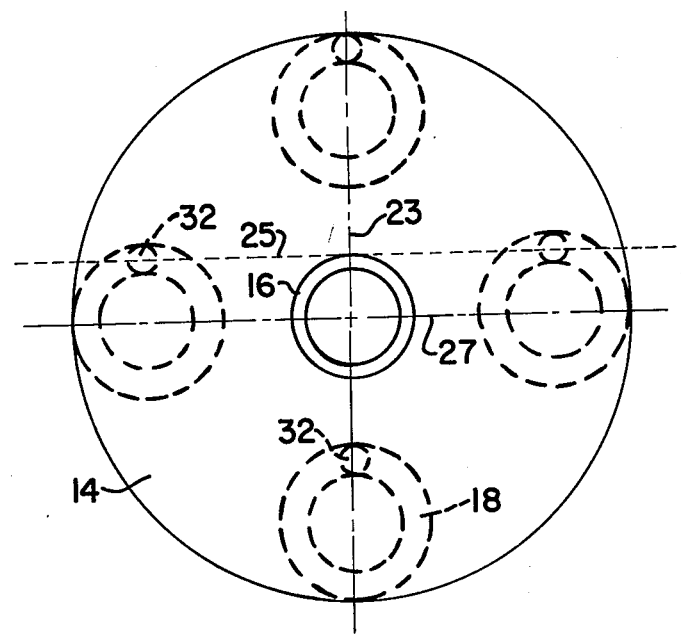
FIG. 1A is an end view of a processor of the type shown in FIG. 1, particularly showing the points of attachment of coils to manifolds in one preferred configuration.
Figure 2A:
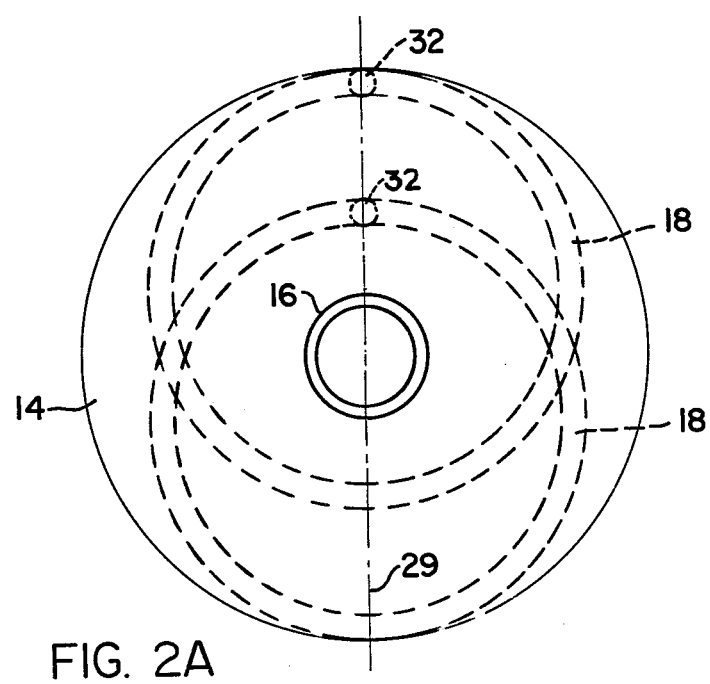
FIG. 2A is an end view of a processor of the type shown in FIG. 2, particularly showing the points of attachment of coils to manifolds in one preferred configuration.

FIGS. 1A and 2A show the points of attachment 32 of the coils to the manifolds in preferred configurations. It will be apparent that in FIG. 1A, where four coils are utilized, two of the attachment points 32 are disposed along a centerline 23, and the other two attachment points are disposed along a line 25 which is spaced from, and parallel to, another centerline 27. In FIG. 2A, the attachment points 32 of two coils are disposed along a common centerline 29.

Figure 3:
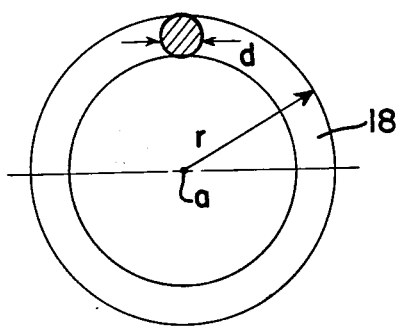
FIG. 3 is an end view of a coil having a circular cross-sectional configuration.
Figure 4:
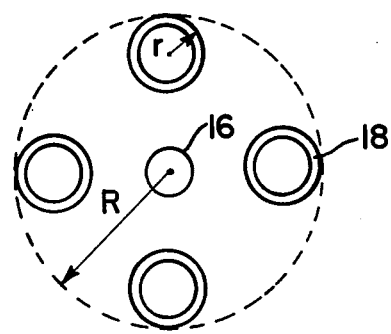
FIG. 4 is a simplified schematic view of one embodiment of a processor in accordance with the invention.
Figure 18:
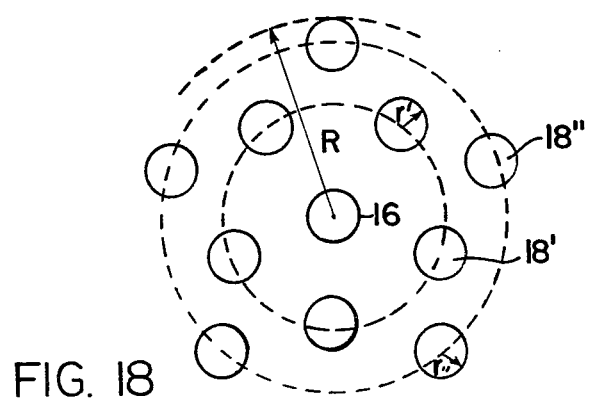
FIG. 18 is a simplified schematic of yet another embodiment configuration of a processor in accordance with the invention.
Figure 19:
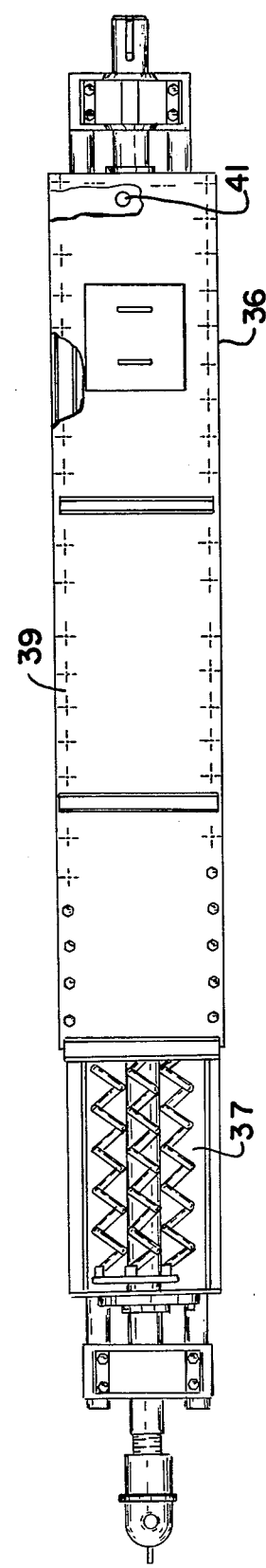
FIG. 19 is a top view of the processor of FIG. 5, particularly showing a housing.

The coils 18 are helical or spiral members which are fixed at each extremity 20 to the respective manifold 14. The coils 18 are solid or hollow, dependent upon the desired operating environment of the processor 10 and are preferably formed by conventional operations for coiling a cylindrical rod or hollow conduit. The coils 18 are of common length (L), pitch (P) and diameter (d) (FIGS. 2 and 3). The diameter d, or the phrase "outer dimension" as used herein with respect to the coil refer to the outer dimension of the tube or rod from which the coil 18 is formed. Although each coil 18 is preferably formed from cylindrical stock, other cross-sectional configurations are equally possible, such as finned or grooved structures, rectangular bars and air-foil cross-sectioned members, among others, and are encompassed within the term outer dimension. The helix radius, that is, the radius from the axial center (a) of the helical coil to the periphery of the envelope defined by the single coil 18, is designated r as shown in FIGS. 3 and 4, and is also common among each coil 18 of a processor 10. The coils 18 are thus interchangeable among one another and can be positioned at each location of a coil as shown in FIGS. 1 or 2. The processor radius, that is, the distance from the axial center of the shaft 16 to the periphery of the outermost coil 18 (FIGS. 4 and 18) is designated R. As explained more fully hereinafter, the coils 18 are preferably fixed to the manifolds 14 in a manner such that the lead angle each makes with respect to the manifold is varied in a prearranged pattern.

Each helical conduit or coil 18 includes a central longitudinal axis (a, FIG. 3). In a processor of the type of FIG. 1, each axis (a) is preferably parallel to and spaced from the axis of the shaft 16. In a processor of the type of FIG. 2, the axis (a) of each conduit can be parallel to and spaced from the axis of the shaft 16, and can also be commonly aligned with the axis of the shaft.

The manifolds 14 can be of any convenient configuration, such as disc shaped as shown in FIGS. 1 and 2. Where the processor 10 is used merely for conveyance or mixing, the manifolds 14 are preferably solid, as are the coils 18. Where the processor is desired to provide a heat transfer function, the coils 18 and manifolds 14 are hollow to allow circulation of a heat transfer medium. Similarly, the shaft 16 can be solid or hollow, and of other than a circular configuration.

An exemplary processor 10 is shown in additional detail in FIGS. 5 through 12, and 19. Particular design parameters are to be selected dependent upon the operational requirements and loadings, and are interrelated. For example, the diameter d of each coil 18 is determined primarily by structural loadings and the volumetric flow rate of a heat transfer medium required to heat or cool the material within the processor. The helix radius, r, is primarily selected to be small enough to provide structural integrity without undue flexure stresses being imposed by the conveyed medium onto the coil, and large enough to provide desired conveyance rates and relative ease of fabrication. The number of coils is primarily selected to provide desired conveyance and heat transfer characteristics, and generally will be as large as possible within the dimensional constraints of the other parameters. The pitch P of each coil is also primarily determined by clearance constraints. The number of coils and pitch are also preferably selected to provide a torque which does not require an excessively large rotational driver, which is of particular concern where highly viscous mediums are being conveyed. For most applications, the interrelationship among the parameters will effectively limit a processor of the type shown in FIGS. 1 and 2 to no more than six to eight coils.

Figure 13:
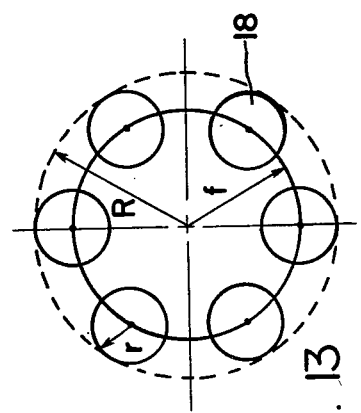
FIG. 13 is a simplified schematic representing an end view of one embodiment of a processor in accordance with the invention.

When identical coils 18 are affixed to the manifolds 14 at the same radial distance (f) from the axial centerline of the shaft, as shown schematically in FIG. 13, a simple and symmetrical manifold configuration is appropriate. The peripheral profile associated with the arrangement of FIG. 13 can approach that of a zero pitch screw, that is, an hour-glass shape. The term "peripheral profile" and the like refer to the appearance to an observer of the outermost radial surface of the plural coils, such as in a plan view. Unexpectedly, it has been found that whether the screw profile is zero-pitch or an extended pitch has no substantial effect on conveyance rates.

Figure 5:
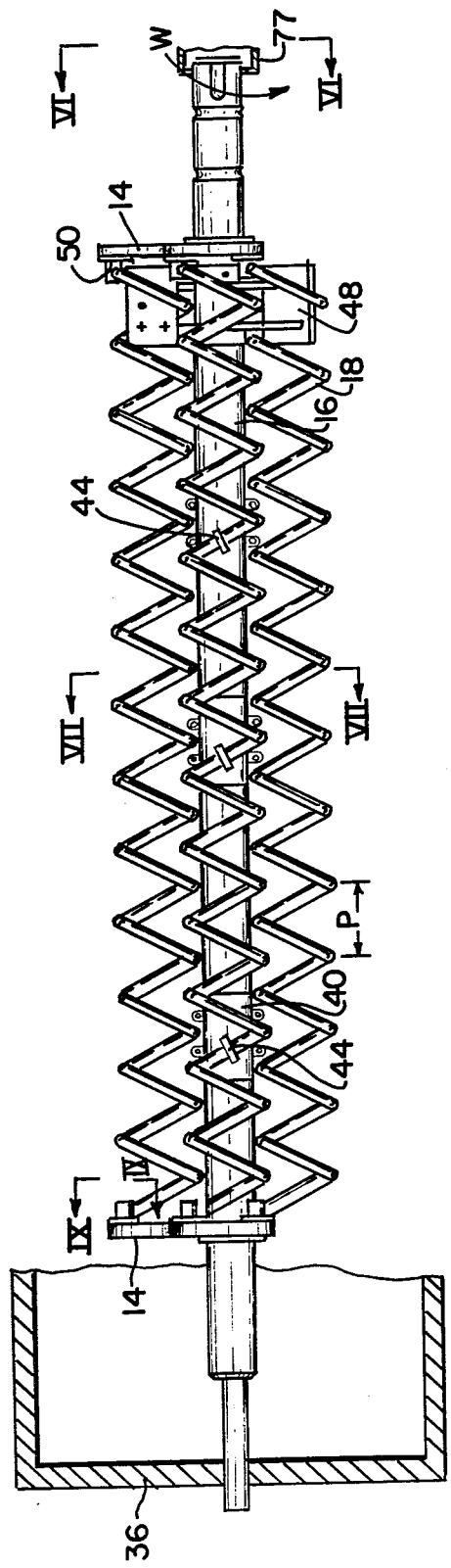
FIG. 5 is a plan view of one embodiment of a material processor in accordance with the invention.
Figure 14:
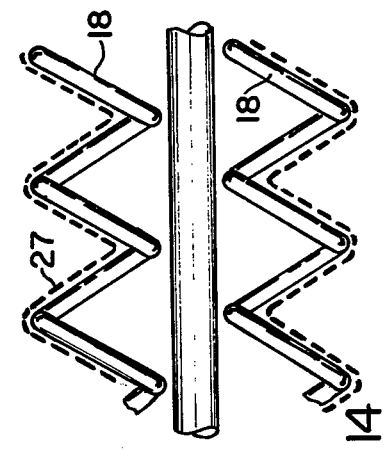
FIG. 14 is a simplified schematic view showing the peripheral envelope of a processor of the type shown in FIG. 5.
Figure 14A:
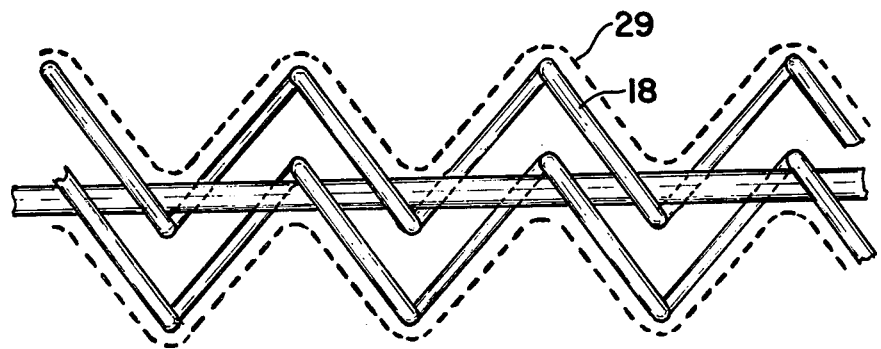
FIG. 14A is a simplified schematic view showing the peripheral envelope of a processor of the type shown in FIG. 2.

In FIG. 14 a peripheral profile 27 has been superimposed as a heavy dashed line onto a plan view of two distinct coils 18 positioned similar to the orientation of the coils of the processor 10 of FIG. 5. In FIG. 14A a peripheral profile 29 has been superimposed as a heavy dashed line onto a plan view of two coils 18 positioned similar to the embodiment of FIG. 2.

Figure 15:
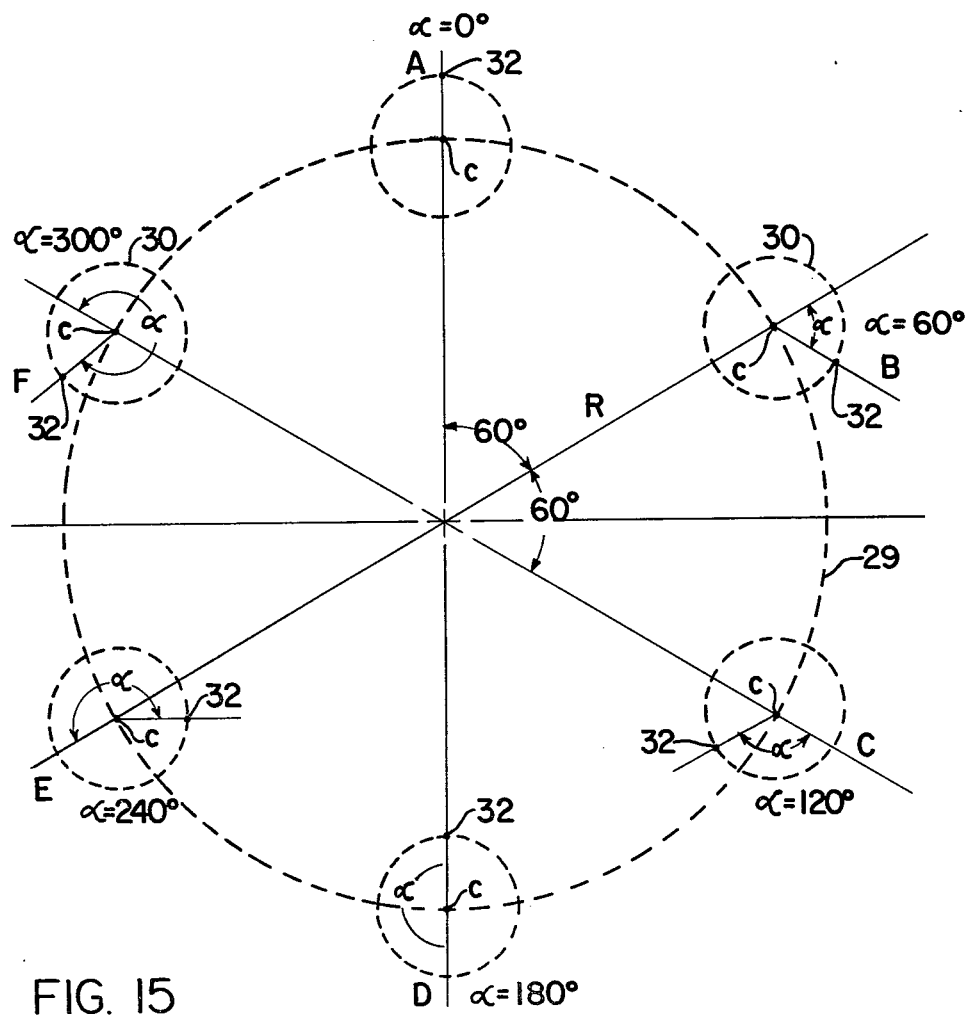
FIG. 15 is a schematic, similar to FIG. 13, showing additional detail of another processor configuration in accordance with the invention.

It has been discovered that where common coils 18 are affixed to the manifolds 14 in accordance with what is herein referred to as a variable lead angle, a desireably high conveyance condition is established. The variable lead angle is best described with reference to FIGS. 15 through 17. Preferably the variation in lead angle among consecutive coils 18 of a processor is constant, and is defined by angle variation $v = 360°/n$, where v is the variation in the lead angle and n is the number of coils of the processor. For example, where six coils are utilized, $v = 60°$. The large dashed circle 29 in FIG. 15 represents the plane of a manifold 14. The smaller dashed circles 30 represent the outer surface of each of six helical coils 18, respectively identified by the letters A through F. The centers, c, of the coils, corresponding to the axes (a), are equally spaced about the larger circle 29, being 60° apart where six coils are selected. Starting with a selected angular position, such as position "A", the angle variation v is determined and, progressing through consecutive coil positions A through F, the variation is applied to the angle $\alpha$. The angle $\alpha$ is measured from the radius R which extends through the center c of each smaller circle 30, and is taken in a clockwise direction. Alternatively, the angle $\alpha$ could be applied in counterclockwise manner. Thus, where $\alpha$ is selected as 0° at coil position A, it is 60° at position B, 120° at position C, 180° at position D, and so forth. Attachment points 32 are thus determined.

Figure 16:
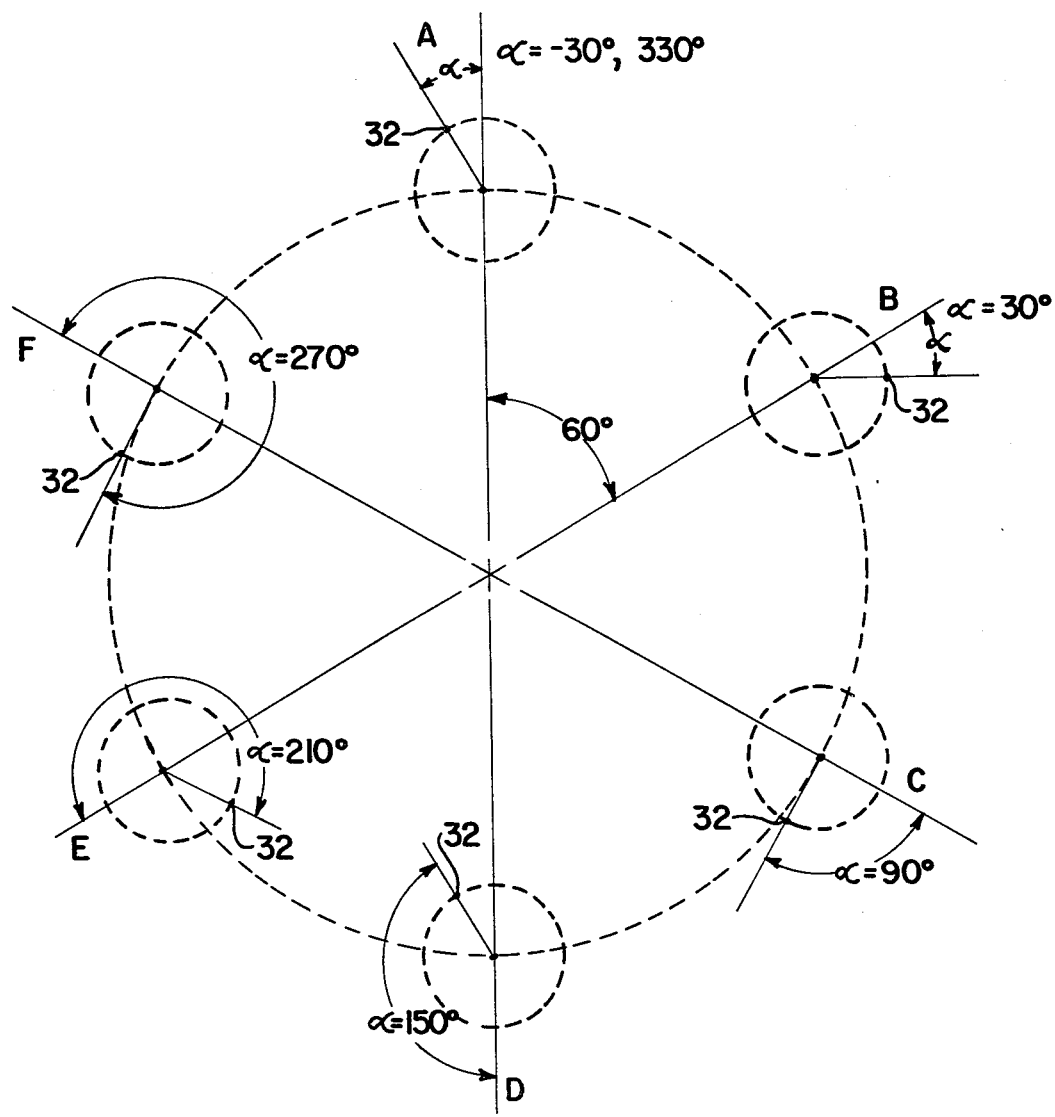
FIG. 16 is a schematic, similar to FIG. 15, showing yet another embodiment configuration in accordance with the invention.

It has also been found that a processor can be more compact and provide good conveying characteristics where the initially selected angular position, $\alpha$, is other than 0°. FIG. 16 shows a configuration where $\alpha$ at position A for a processor having six coils is 330°.

Figure 17:
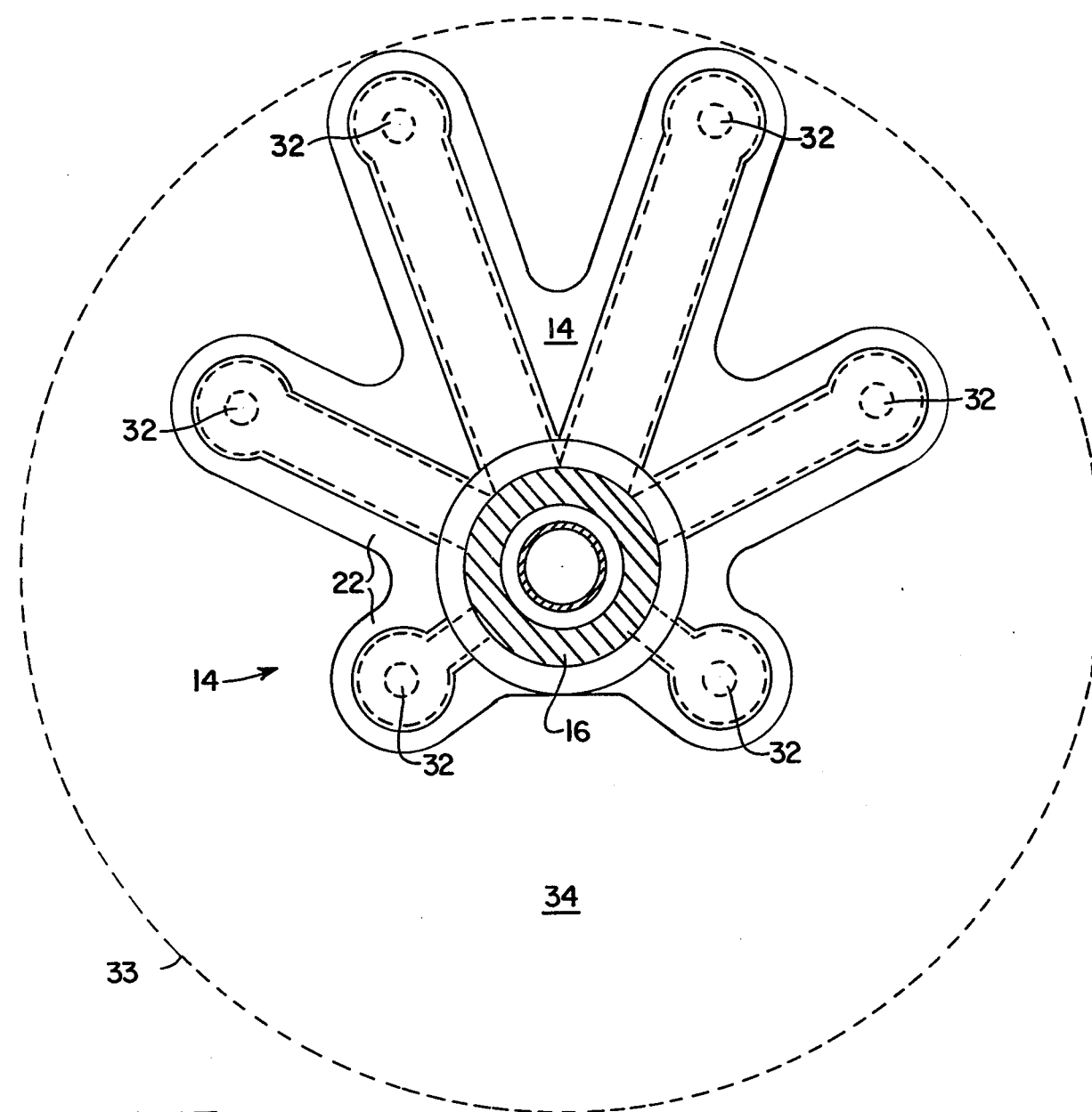
FIG. 17 is a view, partially in section, of a manifold mounted upon a central shaft.

FIG. 17 shows the attachment points 32 as determined in FIG. 16, for which a manifold 14 has been constructed. It will now be apparent that because the radial distance from the center of the central shaft 16 to the preferred attachment points 32 varies, a disc shaped manifold 14 as exemplified by the dashed circle 33 in FIG. 17 could result in regions such as that generally designated at numeral 34 in the lower portion of the Figure, where the flow and thermal characteristics of a heat transfer medium between the disc shaped manifold and the attachment points 32 of the coils 18 at certain positions is substantially different than characteristics through the attachment points into the coils at other positions, creating undesirable thermal stresses. It is desirable to avoid such stresses and configure the processor 10, and particularly the manifolds 14, consistent with the variable lead angle determination, as shown best in FIGS. 16 and 17.

Figure 6:
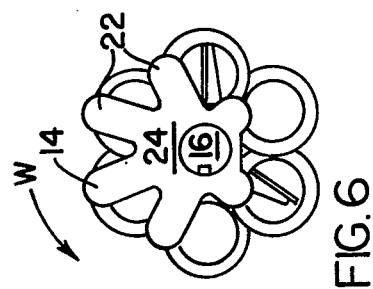
FIG. 6 is an end view taken at VI—VI of FIG. 5, some detail being deleted for clarity.
Figure 7:
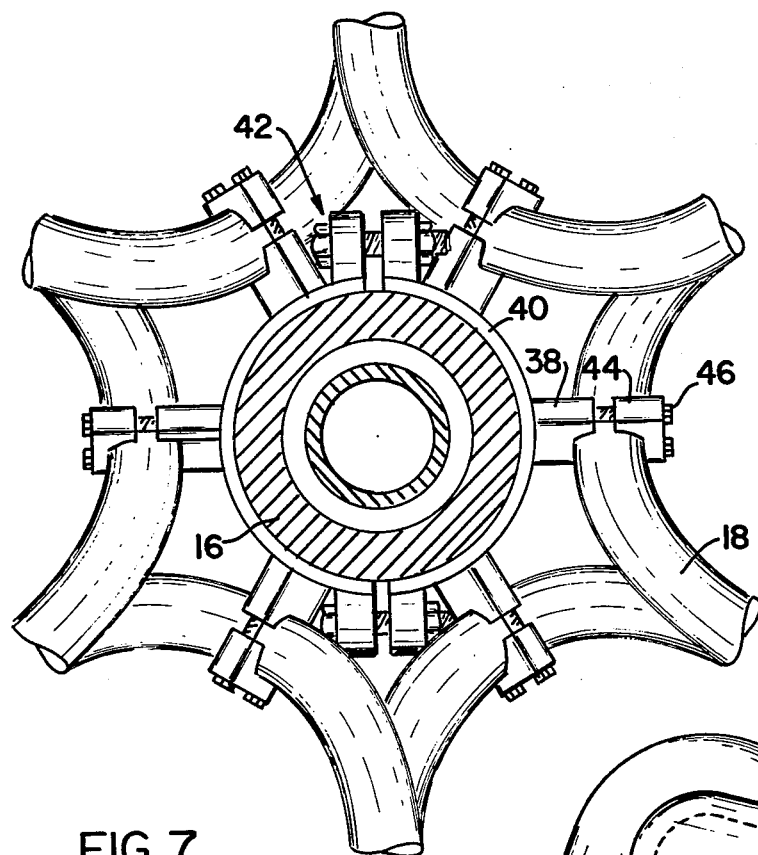
FIG. 7 is a cross-sectional view taken at VII—VII of FIG. 5.

Referring once again to FIGS. 5 through 12 and 19, the manifolds 14 are preferably positioned as mirror images of one another. Thus, the coils 18 are of a length which provides substantially a whole number of turns of pitch P. When the shaft 16 is rotated at an angular velocity $\omega$, counterclockwise as shown in FIGS. 5 and 6, a fluid medium will be conveyed within a trough or housing 36 from left to right as viewed in FIG. 5. The coils 18 can be supported at each extent between the manifolds, and can also include periodically positioned additional support structures. FIG. 7 shows stands 38 removably affixed to a split collar 40 mounted about the central shaft 16 through collar fasteners 42. The coils 18 are removably supported against the stands 38 through a top clamp 44 and fasteners 46. Other supportive structures are equally possible. For example, smooth cover pieces can be utilized where it is desireable to alleviate the number of surfaces or crevices at the attachments.

Fluid material to be processed preferably is fed into the housing 36 (FIG. 19) within which the coil, manifold and shaft assembly is contained through a top inlet 37, and discharged through a side and/or bottom outlet at the discharge end of the housing. A cover 39 is bolted to the top of the trough. Where merely a bottom discharge at one end of the trough is utilized, an uneven distribution of material is likely. Additionally, optimum positioning and sizing of a bottom discharge outlet will vary with the material being conveyed. It is preferable to discharge material through a side outlet opening at an elevation near the top of the trough. The paddles 48 at the discharge end of the assembly prevent a build-up of material and compaction at the bottom of the trough. Bottom discharge outlets 40 are also useful for cleaning of the processor and for discharging material which may get trapped behind the manifolds. It has also been found that a side discharge outlet, as compared to a bottom discharge, reduces the conveyance rate. The elevational position and the size of the side discharge opening can also be varied to vary the conveyance rate.

Figure 9A:
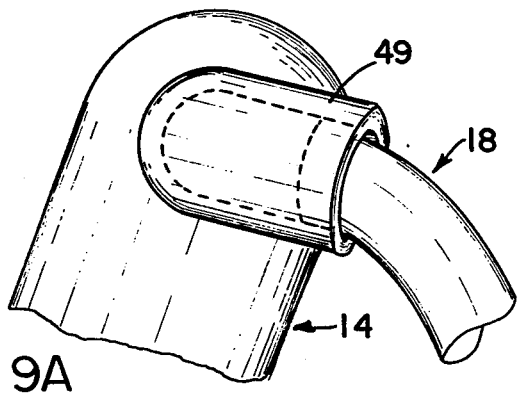
FIG. 9A is a perspective view of an alternative coil and manifold interconnection.
Figure 8:
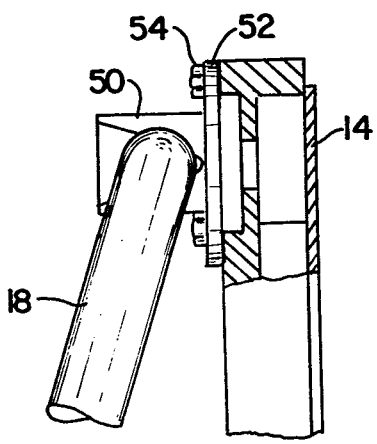
FIGS. 8 and 9 are views taken generally at the region designated IX—IX of FIG. 5, showing a coil and manifold interconnection.
Figure 9:
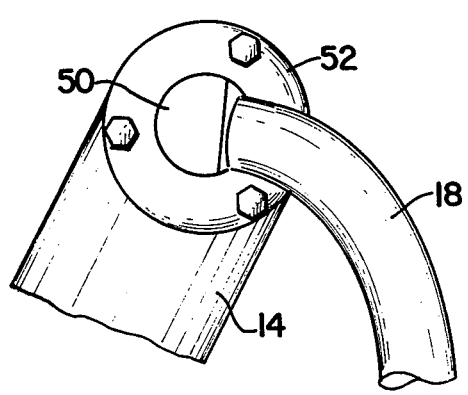

The coils 18 are welded to the manifolds 14 or, to facilitate the attachment an intermediate elbow (49, FIG. 9A) may be used which receives the coils 18 and which is in turn connected to the manifolds 14. The coils 18 may be removably or permanently affixed to the manifolds 14. A sealed interconnection can be made, as shown best in FIGS. 8 and 9, through a support block 50 which is sealingly affixed to the extremity of the coil 18. Where a block or other intermediate connection is made as opposed to the coil being welded directly to the manifold, the total number of pitch turns of the coils will be reduced by a small amount, and will thus not be a whole number. During fabrication, each support block is sealingly affixed to the extremity of the coil 18 such as by welding or a pressure fit. The support block 50 is held sealingly in place by washer 52, which is in turn bolted through bolts 54 to the manifold 14. This creates a fluid tight removable connection which places the interior of a hollow manifold 14 in fluid communication with the interior or a hollow coil 18. The helical coils are sufficiently compressible for installation and, if desired, removal. Initial fabrication is accomplished by loosely affixing the washer 52 to the block 50, welding the coil and blocks into a subassembly, compressing the coil, setting the coil and block subassembly in position, then bolting the washer to the manifold and sealingly tightening the washers into place.

Figure 10:
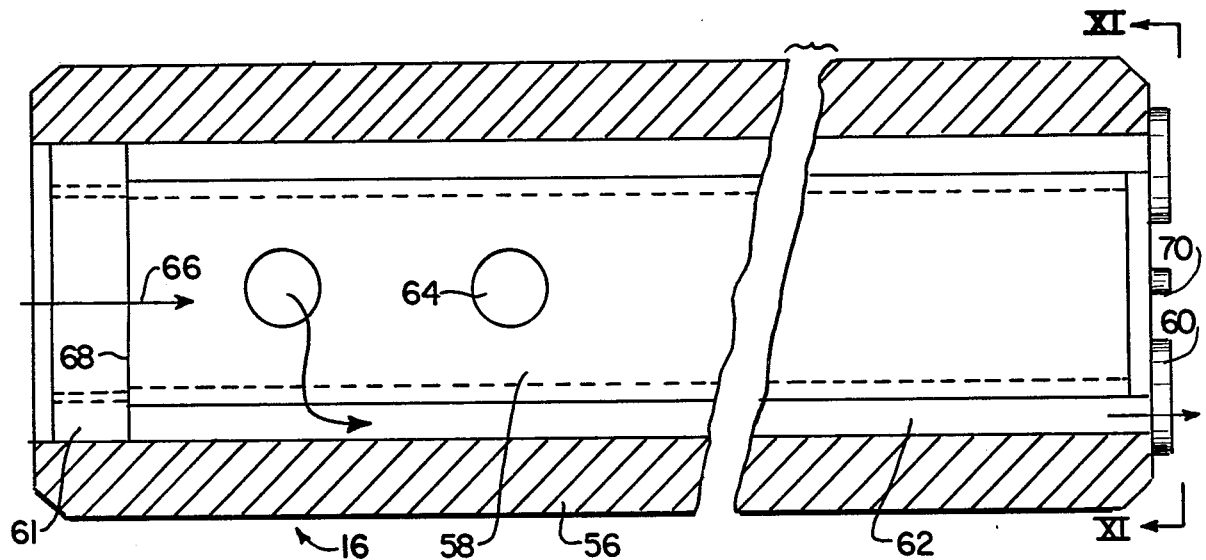
FIG. 10 is a sectional view of a portion of a central shaft in accordance with the invention.
Figure 11:
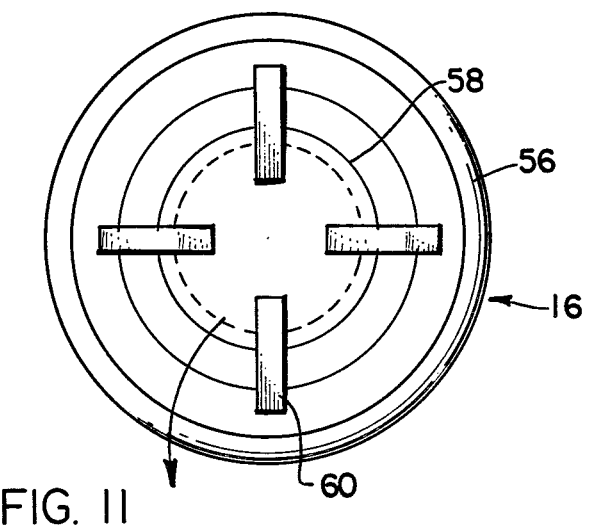
FIG. 11 is an end view taken at XI—XI of FIG. 10.

A preferable central shaft 16 is shown in FIGS. 10 and 11. The shaft 16 includes an outer bar 56 and an inner tube 58. The inner tube is fixedly supported within the bar at one end by a plurality of support rods 60, and at the other by a collar 61, to provide an annulus 62 between the components. The inner tube 58 includes adjacent the inlet end a plurality of openings 64. A heat transfer fluid medium serially flows, as shown by the arrows 66, into an inlet end 68 of the inner tube 58, through the openings 64 into the annulus 62, and is discharged from the shaft 16 assembly at an outlet end 70. This configuration advantageously induces turbulent flow within the annulus to promote heat transfer. A simple, solid or hollow shaft can also be utilized.

Figure 12:
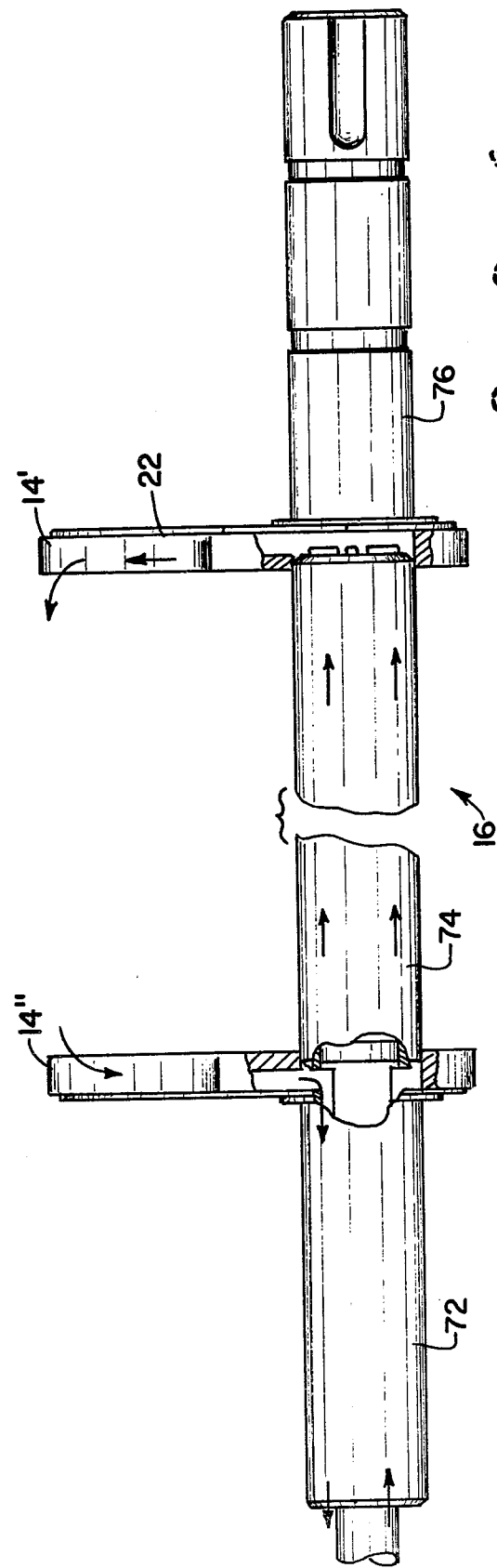
FIG. 12 is a plan view, similar to FIG. 5, some detail being added and some being deleted for clarity.

As shown in FIG. 12, the heat transfer fluid is discharged from the annulus 62 into the downstream manifold 14', through the manifold fingers 22 to the coils, through the coils to the upstream manifold 14'', and through the manifold 14'' back to the shaft and discharge. The central shaft 16 preferably includes three segments, an entrance and sealing gland segment 72, a heat transfer segment 74, and a drive segment 76. The segments and manifolds are connected through threaded edges which are self tightening during rotation. The rotating driver 77 (FIG. 5) and conduits (not shown) for guiding a heat transfer medium to and from the processor are thus positioned at opposite ends of the shaft 16.

Testing was performed on exemplary processor units using several conveyance materials.

The processors varied in pitch and geometry. The number of pipes per screw was held constant at four throughout the series of tests. The materials used included silica sand, coal, vermiculite, and cracked corn. In addition, a mixture of vermiculite and cracked corn was used for some of the runs.

The motor horsepower required was calculated from the current and voltage drawn by the DC motor. RPM was measured by timing the shaft revolutions over ten (10) revolutions. The conveyance was determined by measuring the bulk density of the material, and then collecting the discharge for a measured time interval. The conveyance was then calculated in terms of cubic feet per hour ($ft^3$/hr).

The tests demonstrated a strong interdependence or interaction between the processor geometry and the material being processed. That is, unexpectedly, one processor would perform better than another for one material, but this relation would not necessarily hold true for a different material.

The processors tested included those of the type of FIG. 1 and of FIG. 2, and included a zero pitch configuration. Conveyance was demonstrated in all cases.

The initial tests utilized a free flowing bottom discharge. With the material able to freely flow and little resistance provided by the processor, a major portion of the trough was empty and a significant portion of the heat transfer area was removed from contact with the solid. The side discharge configuration with paddles is thus preferred.

The material conveyance rate is not a simple function of the processor configuration or the material to be conveyed. FIGS. 20 through 24 are graphical representations of the test results. The Table I data corresponds to these figures. The parameter identified as the helix center radius is the distance from the axis of the shaft to the axis of the coil.

Figure 20:
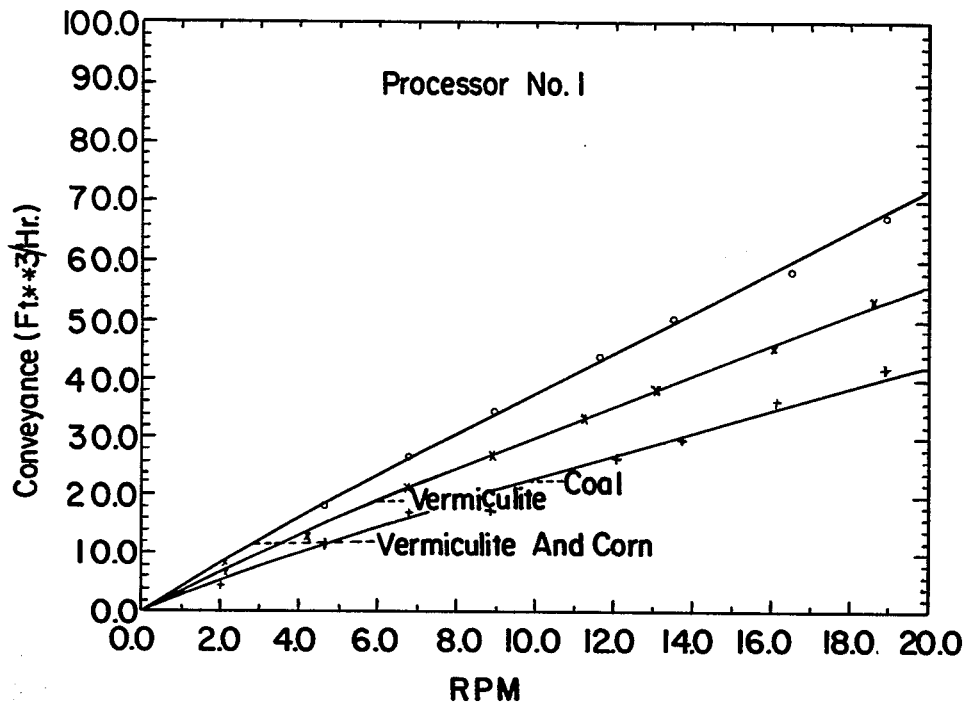
FIGS. 20 through 24 are graphical representations of test data plotting conveyance as a function of angular velocity.

While the graphs display a non-linear relationship between conveyance and processor RPM, it is not deemed to be significant. The difference between a fitted linear function and the actual data is believed to be within the accuracy bounds of the test. The fitted curves shown in FIGS. 20 through 24 are second order power functions, i.e., $y = a*x^n$. Table I lists these values along with the average slope (conveyance rate) and the measured torque for each of the processors. Also included in Table I are key processor characteristics. FIG. 20 shows the conveyance characteristics of a processor with removable coils. This test was conducted using a bottom discharge. All three curves are for identical conditions except for the material being processed.

Figure 21:
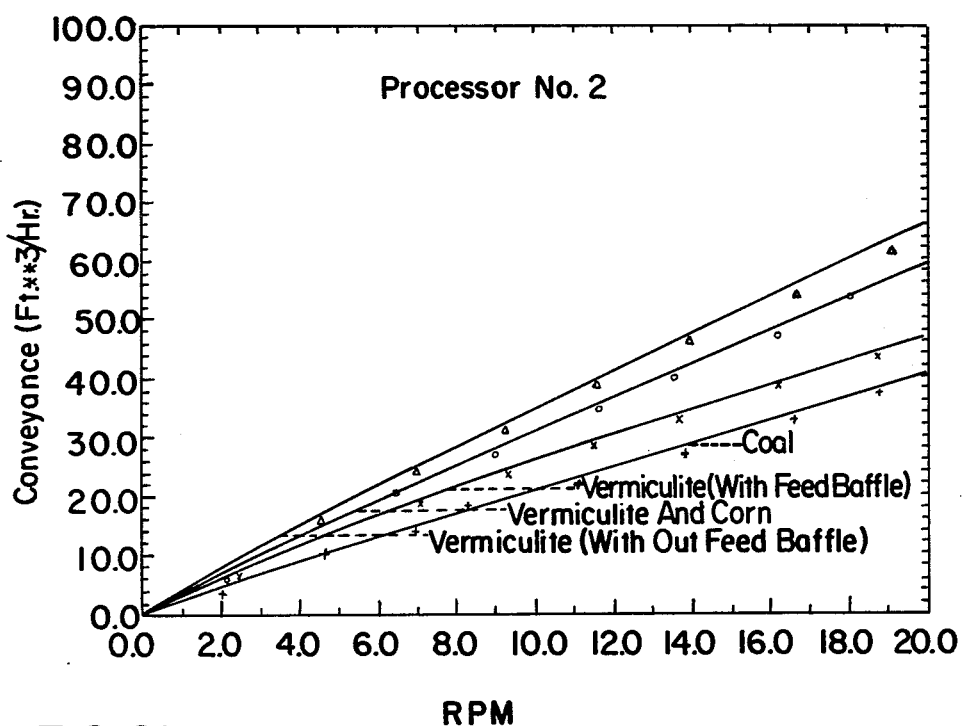
Figure 22:
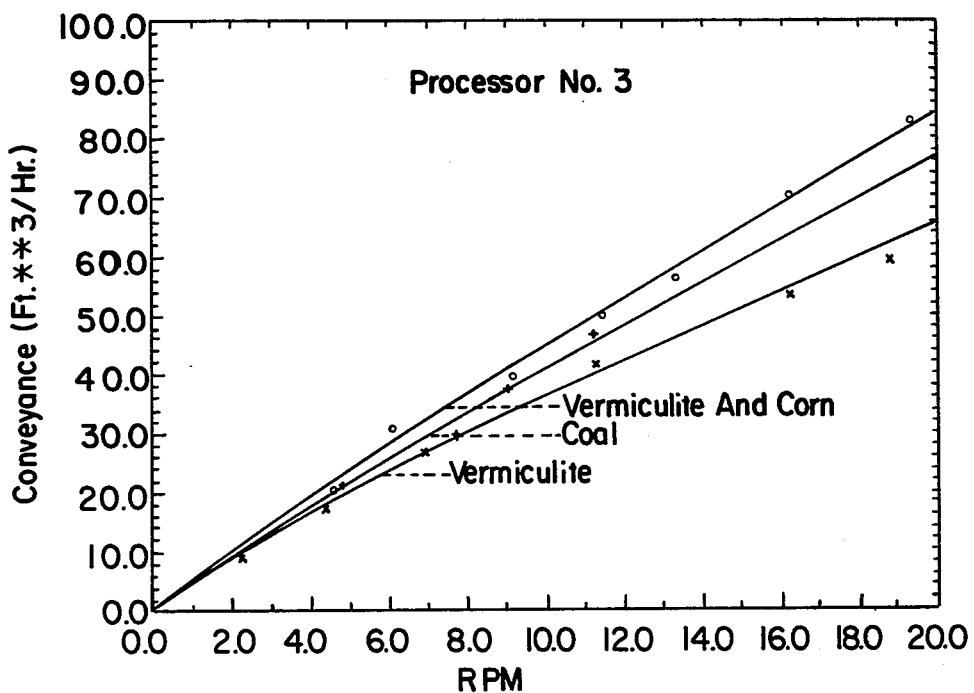

A zero pitch, non-removable configuration processor was used for the tests shown in FIG. 21. In addition, the effect of a feed baffle is shown. The baffle allowed the trough to only fill to that level which covered the coils. This addition eliminates any material which would have been carried along by material flow, but no interacting with the coils. The materials showed the same relative tendency to convey as shown in FIG. 20; vermiculite and corn mix was first, followed by vermiculite and finally coal. The processor No. 3, FIG. 22, was configured similar to processor No. 2, except it was not zero pitch, and the helix pitch was increased from three to six inches. It is believed that whether the screw is zero-pitch or otherwise has little effect on conveyance. The surprising aspect of FIG. 22 is that coal conveyed better than vermiculite. This is the reverse of the previous two figures, and is not fully understood. The conveyance of all materials shows a significant increase over that of processor No. 2, which is generally a result of a doubling of the pitch.

Figure 23:
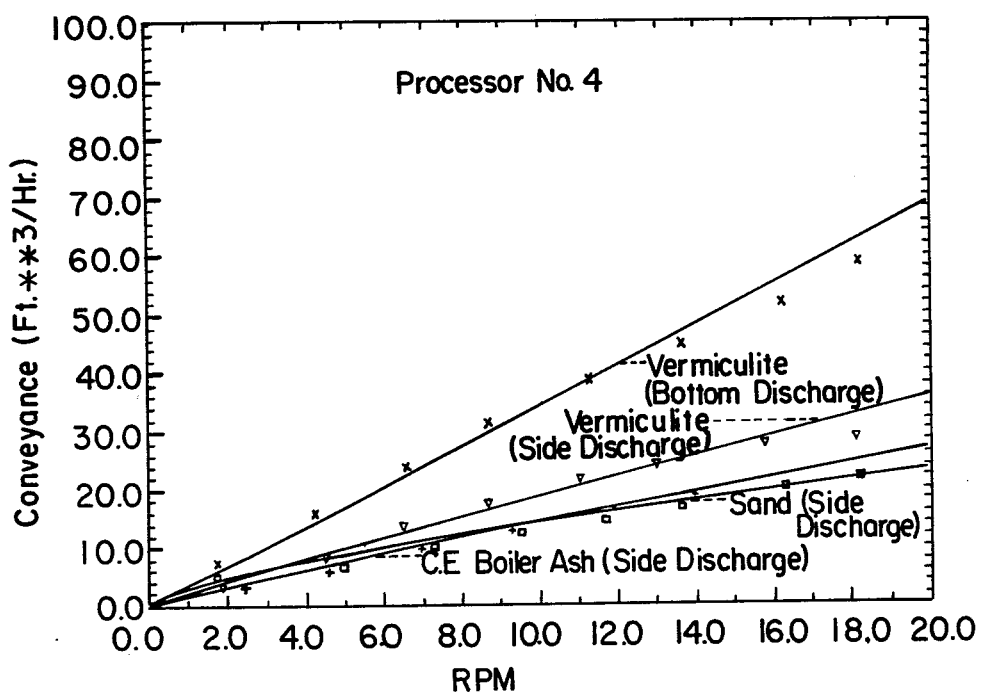

The curves in FIG. 23 represent a processor with removable coils and a significantly reduced pitch. In all other respects it is identical to processor No. 1. FIG. 23 shows the effect of using a side discharge instead of a bottom discharge. The conveyance rate for vermiculite using a side discharge is about 50% of the conveyance rate with a bottom discharge. This implies that the screw would have to turn twice as fast in order to achieve the same conveyance. Due to the decrease in pitch, it could be expected that the conveyance rate of processor No. 4 would be less than for processor No. 1. However, the result which is shown does not support this expectation, and is not fully understood.

Figure 24:
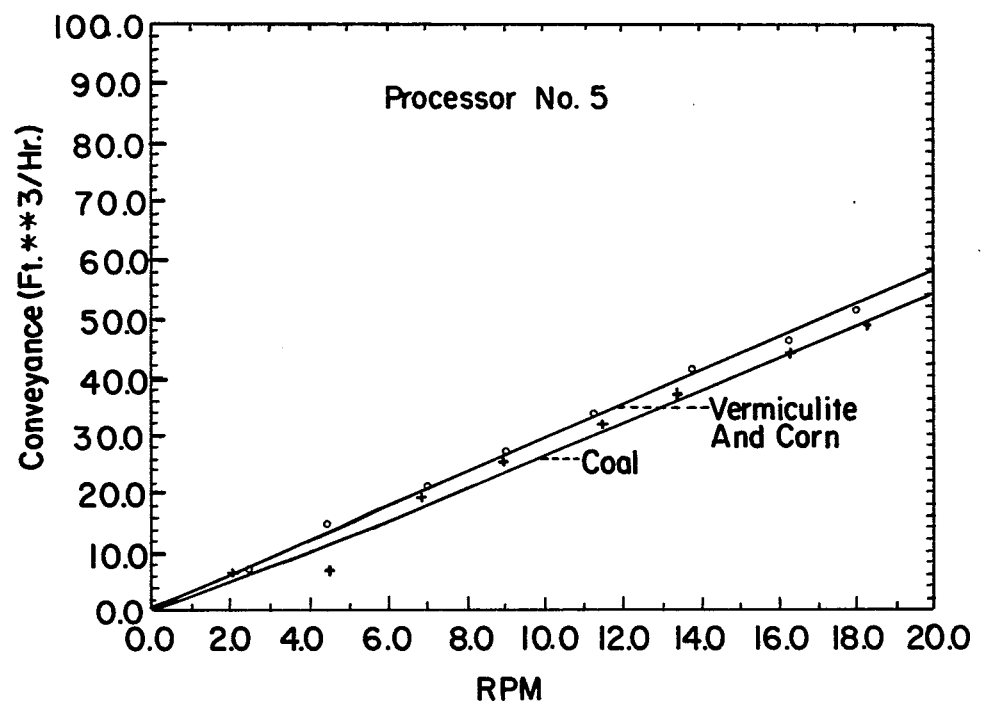

A restricted bottom discharge was used for the series of tests shown in FIG. 24. When compared to FIG. 21, a definite decrease in conveyance rate is evident. The curves seem to indicate a generally constant rate, independent of the material. While this is desirable, it imposes extreme demands on the drive and increases the stress in the processor. Significant material degradation will also occur.

The test data showed very good stability during each test. The data scatter as shown in the attached figures was extremely small. The data is limited, especially when the number of variables present is considered. Therefore, the conclusions which follow are tentative.

An increase in pitch will result in a better rate of conveyance. This does have an upper limit, since an infinite pitch configuration would be analagous to a series of parallel pipes. As the pitch increases, the amount of heat transfer area decreases for the same number of pipes. If the pitch is made too small, the material will not be able to efficiently enter and exit the center area of the processor, again resulting in a loss of heat transfer area. The zero pitch configuration shows generally the same conveyance when compared to a similar processor which is not zero pitch. This would not be expected since the motion of the material is not directly forced to convey along its entire length. This ability to convey material appears to be due to conveyance at discrete positions with the material being pushed into the cavity made by the previous location of the coil.

Based upon these tests it is felt that the following material parameters are particularly important: the particle size, the shearing characteristics, the bulk density, the self-adhesion strength, and the thermal characteristics of the material. The particularly important screw characteristics are: pitch, number of coils, helix center distance, helix radius, coil length, coil diameter, manifold configuration, discharge location, feed hopper depth, and RPM.

It will be recognized that configurations in addition to those specifically described can be utilized within the scope of the present invention. For example, enlarged radii can result in coils which are overly flexible, particularly where it is desireable to maintain a sufficiently thin walled structure so as to provide good heat transfer characteristics. The embodiment exemplified in FIG. 18 overcomes such limitations. Inner coils 18' are positioned as described above. A second set of outer coils 18" is positioned at a greater radial distance from the central shaft than are the inner coils. The outer coils 18" can be of common parameters as the inner coils 18' or can differ. For example, the helix radius r" of the outer coils 18" can be smaller, or larger, than the radius r' of the inner coils 18'. The outer coils 18" are fabricated to be interchangeable among one another, and the inner coils 18' are interchangeable among one another.

Additionally, the direction of pitch of a selected number of coils can be reoriented to obtain a desired degree of mixing and conveyance. For example, three of five coils can be oriented to convey from inlet toward outlet, and the remaining two coils oriented to convey from outlet toward inlet. No interference results from the change in direction of pitch in a processor where the coils individually do not surround the central shaft.

As many additional modifications are possible, the description and figures are intended to be taken as illustrative, and not in a limiting sense.

TABLE I

| | PROCESSOR NO. | PITCH | HELIX RADIUS | HELIX CENTER RADIUS | COIL SURFACE AREA | COIL VOLUME | OFFSET ANGLE | CONVEYANCE RATE | TORQUE | CURVE PARAMETER $a^{(1)}$ | CURVE PARAMETER $n^{(1)}$ | DESIGNATION |
|---|---|---|---|---|---|---|---|---|---|---|---|---|
| | | | | | | | UNITS | | | | | |
| | | (inches) | (inches) | (inches) | (sq. inches) | (cu. inches) | (degrees) | (Ft³/hr/RPM) | in-# | | | |
| VERMICULITE | 1 | 3.0 | 1.5625 | 2.0625 | 80.626 | 5.039 | −90.0 | 2.7 | 43 | 3.835 | 0.895 | R |
| COAL | 1 | 3.0 | 1.5625 | 2.0625 | 80.626 | 5.039 | −90.0 | 2.4 | 60 | 3.045 | 0.880 | R |
| VERMICULITE AND CORN | 1 | 3.0 | 1.5625 | 2.0625 | 80.626 | 5.039 | −90.0 | 3.8 | 49 | 4.272 | 0.943 | R |
| VERMICULITE (W/FEED BAFFLE) | 2 | 3.0 | 2.5 | 1.25 | 125.600 | 7.850 | 0.0 | 2.6 | 39 | 3.546 | 0.862 | Z,N |
| VERMICULITE (W/O FEED BAFFLE) | 2 | 3.0 | 2.5 | 1.25 | 125.600 | 7.850 | 0.0 | 3.5 | 44 | 3.954 | 0.940 | Z,N |
| COAL | 2 | 3.0 | 2.5 | 1.25 | 125.600 | 7.850 | 0.0 | 2.1 | 54 | 2.260 | 0.965 | Z,N |
| VERMICULITE AND CORN | 2 | 3.0 | 2.5 | 1.25 | 125.600 | 7.850 | 0.0 | 3.1 | 52 | 3.852 | 0.938 | Z,N |
| VERMICULITE | 3 | 6.0 | 2.5 | 1.25 | 66.032 | 4.127 | −90.0 | 3.8 | 46 | 5.026 | 0.859 | N |
| COAL | 3 | 6.0 | 2.5 | 1.25 | 66.032 | 4.127 | −90.0 | 4.3 | 56 | 5.047 | 0.910 | N |
| VERMICULITE AND CORN | 3 | 6.0 | 2.5 | 1.25 | 66.032 | 4.127 | −90.0 | 4.6 | 55 | 5.399 | 0.919 | N |
| VERMICULITE (BOTTOM DISC.) | 4 | 1.875 | 1.5625 | 2.0625 | 125.600 | 7.850 | −90.0 | 3.5 | 48 | 3.174 | 1.030 | R |
| VERMICULITE (SIDE DISC.) | 4 | 1.875 | 1.5625 | 2.0625 | 125.600 | 7.850 | −90.0 | 1.9 | 59 | 2.279 | 0.920 | |
| SAND (SIDE DISC.) | 4 | 1.875 | 1.5625 | 2.0265 | 125.600 | 7.850 | −90.0 | 1.6 | 164 | 2.937 | 0.693 | |
| BOILER ASH (SIDE DISC.) | 4 | 1.875 | 1.5625 | 2.0265 | 125.600 | 7.850 | −90.0 | 1.5 | 173 | 1.757 | 0.914 | |
| COAL | 5 | 3.0 | 2.5 | 1.25 | 125.600 | 7.850 | −90.0 | 2.6 | 61 | 2.183 | 1.074 | N |
| VERMICULITE AND CORN | 5 | 3.0 | 2.5 | 1.25 | 125.600 | 7.850 | −90.0 | 2.9 | 53 | 2.843 | 1.009 | N |
| VERMICULITE | 1 | 3.0 | 1.5625 | 2.0625 | 80.626 | 5.039 | −90.0 | 2.7 | 43 | 3.835 | 0.895 | R |
| COAL | 1 | 3.0 | 1.5625 | 2.0625 | 80.626 | 5.039 | −90.0 | 2.4 | 60 | 3.045 | 0.880 | R |
| VERMICULITE AND CORN | 1 | 3.0 | 1.5625 | 2.0625 | 80.626 | 5.039 | −90.0 | 3.8 | 49 | 4.272 | 0.943 | R |
| VERMICULITE (W/FEED BAFFLE) | 2 | 3.0 | 2.5 | 1.25 | 125.600 | 7.850 | 0.0 | 2.6 | 39 | 3.546 | 0.862 | Z,N |
| VERMICULITE (W/O FEED BAFFLE) | 2 | 3.0 | 2.5 | 1.25 | 125.600 | 7.850 | 0.0 | 3.5 | 44 | 3.954 | 0.940 | Z,N |
| COAL | 2 | 3.0 | 2.5 | 1.25 | 125.600 | 7.850 | 0.0 | 2.1 | 54 | 2.260 | 0.965 | Z,N |
| VERMICULITE AND CORN | 2 | 3.0 | 2.5 | 1.25 | 125.600 | 7.850 | 0.0 | 3.1 | 52 | 3.582 | 0.938 | Z,N |
| VERMICULITE | 3 | 6.0 | 2.5 | 1.25 | 66.032 | 4.127 | −90.0 | 3.8 | 46 | 5.026 | 0.859 | N |
| COAL | 3 | 6.0 | 2.5 | 1.25 | 66.032 | 4.127 | −90.0 | 4.3 | 56 | 5.047 | 0.910 | N |
| VERMICULITE AND CORN | 3 | 6.0 | 2.5 | 1.25 | 66.032 | 4.127 | −90.0 | 4.6 | 55 | 5.399 | 0.919 | N |
| VERMICULITE (BOTTOM DISC.) | 4 | 1.875 | 1.5625 | 2.0625 | 125.600 | 7.850 | −90.0 | 3.5 | 48 | 3.174 | 1.030 | R |
| VERMICULITE (SIDE DISC.) | 4 | 1.875 | 1.5625 | 2.0625 | 125.600 | 7.850 | −90.0 | 1.9 | 59 | 2.279 | 0.920 | |
| SAND (SIDE DISC.) | 4 | 1.875 | 1.5625 | 2.0625 | 125.600 | 7.850 | −90.0 | 1.6 | 164 | 2.937 | 0.693 | |
| BOILER ASH (SIDE DISC.) | 4 | 1.875 | 1.5625 | 2.0625 | 125.600 | 7.850 | −90.0 | 1.5 | 173 | 1.757 | 0.914 | |
| COAL | 5 | 3.0 | 2.5 | 1.25 | 125.600 | 7.850 | −90.0 | 2.6 | 61 | 2.183 | 1.074 | N |
| VERMICULITE AND CORN | 5 | 3.0 | 2.5 | 1.25 | 125.600 | 7.850 | −90.0 | 2.9 | 53 | 2.843 | 1.009 | N |

[1] Coefficients used to fit data to $C = a \cdot (RPM)^n$
[2] R designates removable coils (FIG. 1 Type)
Z designates zero pitch screw
N designates non-removable pipes (FIG. 2 Type)

We claim:

1. A rotary material processor comprising:
a pair of spaced manifolds:
an elongated rotatable shaft affixed between said manifolds:
a plurality of helical coils of multiple turns, said coils being formed of an element of circular cross section and said coils being of common length:
each said coil being affixed at one extent to one of said manifolds and at the other extent to the other of said manifolds, and being positioned aside said shaft.

2. The processor of claim 1 wherein each said helical coil and said manifolds include hollow portions and wherein said hollow portions of said coils are in fluid communication with said hollow portions of said manifolds.

3. The processor of claim 2 wherein said shaft includes a hollow portion and wherein said hollow portion of said shaft is in fluid communication with said hollow portions of said manifolds.

4. The processor of claim 1 wherein each said helical coil is formed about a longitudinal axis, and wherein each said axis is parallel to and spaced from said shaft.

5. The processor of claim 1 wherein said helical conduits are removably affixed to said manifolds.

6. The processor claim 1 wherein the direction of pitch of at least one of said coils is opposite to the direction of pitch of another one of said coils.

7. The processor of claim 1 wherein the peripheral profile of said plurality of coils defines the envelope of a zero pitch screw.

8. The processor of claim 1 wherein said manifolds are shaped as a plurality of asymmetrically positioned fingers extending outwardly from a central mass, at least some of said fingers being of differing length.

9. The processor of claim 1 wherein there are N coils, each having a longitudinal axis, said longitudinal axes being positioned with respect to each other by an angle taken from the center of said shaft of $360°/N$.

10. The processor of claim 9 wherein $\alpha$ is an angle in a selected plane parallel to the plane of one of said manifolds taken from a processor radius (R) through the longitudinal axis of each said coil, to a line extending from each said longitudinal axis to the point at which said coil intersects said selected plane, and wherein $\alpha$ varies from one coil to the next adjacent coil by an angular amount v, and wherein $v = 360°/N$.

11. The processor of claim 10 wherein $N=6$, and wherein $\alpha$ for one of said coils is 0°.

12. The processor of claim 10 wherein $N=6$, and wherein $\alpha$ for one of said coils is 330°.

13. The processor of claim 10 wherein said selected plane is the plane at which said coils attach to said one manifold.

14. The processor of claim 9 wherein $\alpha$ is an angle in the plane of attachment of said coils to one of said manifolds taken from a processor radius (R) through the longitudinal axis of each said coil, to a line extending from each said longitudinal axis to the attachment point of said respective coil to said manifold, and wherein $\alpha$ varies from one coil to the next adjacent coil by an angular amount v, and wherein $v = 360°/N$.

15. The processor of claim 1 wherein each said coil is affixed to said manifolds through a support block and clamping washer.

16. The processor of claim 1 wherein the number of pitch turns of each said coil is substantially a whole number.

17. The processor of claim 1 further comprising a housing surrounding said manifolds and coils, and wherein said shaft extends externally of said housing, and further comprising means disposed externally of said housing for rotating said shaft.

18. The processor of claim 17 further comprising means for discharging material from said processor including an outlet through the side of said housing.

19. The processor of claim 18 further comprising a plurality of paddles rotatable with said shaft for directing material to said side outlet.

20. The processor of claim 1 further comprising a plurality of paddles rotatable with said shaft to direct material from below said shaft to an elevation above said shaft.

21. The processor of claim 1 wherein at least two of said coils are affixed to one of said manifolds at attachment points which attachment points are aligned along a centerline extending radially from said shaft.

22. A rotary type material processor comprising:
a rotatable central shaft:
a plurality of helical coils each having a longitudinal axis and a plurality of turns, said coils being of substantially identical length and said coils being formed of an element of circular cross section: and
means rotatable with said shaft at each end of said coils for supporting said coils with said longitudinal axes parallel to and spaced from said shaft a distance such that said coils are positioned aside said shaft.

23. The processor of claim 22 wherein said supporting means comprise manifolds, one end of said coils being affixed to said manifolds at attachment points, said processor having four coils and two perpendicular radial centerlines extending through said longitudinal axes of said four coils, said attachment points of two of said coils being disposed along one of said centerlines and said attachment points of the other two of said coils being disposed along a line parallel to and spaced from the other of said centerlines.

24. The processor of claim 22 wherein said supporting means comprise manifolds, one end of said coils being affixed to said manifolds at attachment points, said processor having two coils and a radial centerline extending through said longitudinal axes of said two coils, said attachment points of said two coils being disposed along said radial centerline.

25. A rotary heat exchanger comprising:
a pair of parallel spaced manifolds, said manifolds each having an interior flow space:
a shaft affixed between said manifolds:
means for rotating said shaft and said manifolds:
a plurality of hollow helical conduits of multiple turns, each said conduit being positioned aside said shaft and being of common length and being of circular cross section: and
means for affixing each extent of each said conduit to said manifolds in fluid communication with said interior flow space.

26. A rotary material processor comprising:
a rotatable central shaft:
a plurality of coils each having a plurality of turns, said coils being formed of elements of circular cross section:
manifolds rotatable with said shaft at each end of said coils:
means for removably supporting coils between said manifolds:
said coils being positioned aside said shaft and being of a common length and interchangeably supportable between said manifolds.

* * * * *